(12) United States Patent
Bai et al.

(10) Patent No.: US 12,507,097 B2
(45) Date of Patent: Dec. 23, 2025

(54) BEAM FAILURE RECOVERY IN SIDELINK COMMUNICATIONS

(71) Applicant: QUALCOMM Incorporated, San Diego, CA (US)

(72) Inventors: Tianyang Bai, Somerville, NJ (US); Hua Wang, Basking Ridge, NJ (US); Yan Zhou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/185,440

(22) Filed: Mar. 17, 2023

(65) Prior Publication Data

US 2024/0314599 A1    Sep. 19, 2024

(51) Int. Cl.
*H04W 24/08* (2009.01)
*H04W 76/14* (2018.01)
*H04W 76/19* (2018.01)

(52) U.S. Cl.
CPC ............ *H04W 24/08* (2013.01); *H04W 76/14* (2018.02); *H04W 76/19* (2018.02)

(58) Field of Classification Search
CPC ..... H04W 24/08; H04W 76/19; H04W 76/14; H04W 16/18; H04W 36/0033; H04W 8/005; H04W 8/18; H04W 88/04; H04L 43/00
See application file for complete search history.

(56) References Cited

U.S. PATENT DOCUMENTS

| | | | |
|---|---|---|---|
| 2018/0302889 A1* | 10/2018 | Guo | H04B 7/06964 |
| 2019/0173740 A1* | 6/2019 | Zhang | H04L 41/0677 |
| 2020/0350972 A1* | 11/2020 | Yi | H04B 7/088 |
| 2022/0022068 A1* | 1/2022 | Ryu | H04B 7/088 |
| 2022/0124514 A1* | 4/2022 | Lee | H04W 74/0841 |
| 2022/0247475 A1* | 8/2022 | Zhou | H04B 7/06968 |
| 2022/0322113 A1* | 10/2022 | Zhang | H04B 7/088 |

* cited by examiner

*Primary Examiner* — Mewale A Ambaye
(74) *Attorney, Agent, or Firm* — Harrity & Harrity LLP

(57) ABSTRACT

Wireless communications systems, apparatuses, and methods are provided. A method of wireless communication performed by a sidelink user equipment (UE) includes receiving, from a first candidate relay UE, a plurality of beam failure detection reference signals (BFD RSs) associated with a first plurality of beams, detecting, based on at least one BFD RS of the plurality of BFD RSs, a beam failure associated with a first beam of the first plurality of beams based on a measurement associated with the first beam, and transmitting, to at least one of the first candidate relay UE or a network unit, an indicator indicating the detected beam failure.

18 Claims, 9 Drawing Sheets

BEAM FAILURE RECOVERY IN SIDELINK COMMUNICATIONS

TECHNICAL FIELD

This application relates to wireless communication systems, and more particularly, to beam failure recovery for sidelink user equipment in wireless communication systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing may extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR may be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a sidelink user equipment (UE) may include receiving, from a first candidate relay UE, a plurality of beam failure detection reference signals (BFD RSs) associated with a first plurality of beams; detecting, based on at least one BFD RS of the plurality of BFD RSs, a beam failure associated with a first beam of the first plurality of beams based on a measurement associated with the first beam; and transmitting, to at least one of the first candidate relay UE or a network unit, an indicator indicating the detected beam failure.

In an additional aspect of the disclosure, a method of wireless communication performed by a candidate relay user equipment (UE) may include receiving, from a sidelink UE, a plurality of beam failure detection reference signals (BFD RSs) associated with a plurality of beams; detecting, based on at least one BFD RS of the plurality of BFD RSs, a beam failure associated with a first beam of the plurality of beams based on a measurement associated with the first beam; and transmitting, to at least one of the sidelink UE or a network unit, an indicator indicating the detected beam failure.

In an additional aspect of the disclosure, a sidelink user equipment (UE) may include a memory; a transceiver; and at least one processor coupled to the memory and the transceiver, wherein the sidelink UE is configured to receive, from a first candidate relay UE, a plurality of beam failure detection reference signals (BFD RSs) associated with a first plurality of beams; detect, based on at least one BFD RS of the plurality of BFD RSs, a beam failure associated with a first beam of the first plurality of beams based on a measurement associated with the first beam; and transmit, to at least one of the first candidate relay UE or a network unit, an indicator indicating the detected beam failure.

In an additional aspect of the disclosure, a candidate relay user equipment (UE) may include a memory; a transceiver; and at least one processor coupled to the memory and the transceiver, wherein the candidate relay UE is configured to receive, from a sidelink UE, a plurality of beam failure detection reference signals (BFD RSs) associated with a plurality of beams; detect, based on at least one BFD RS of the plurality of BFD RSs, a beam failure associated with a first beam of the plurality of beams based on a measurement associated with the first beam; and transmit, to at least one of the sidelink UE or a network unit, an indicator indicating the detected beam failure.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
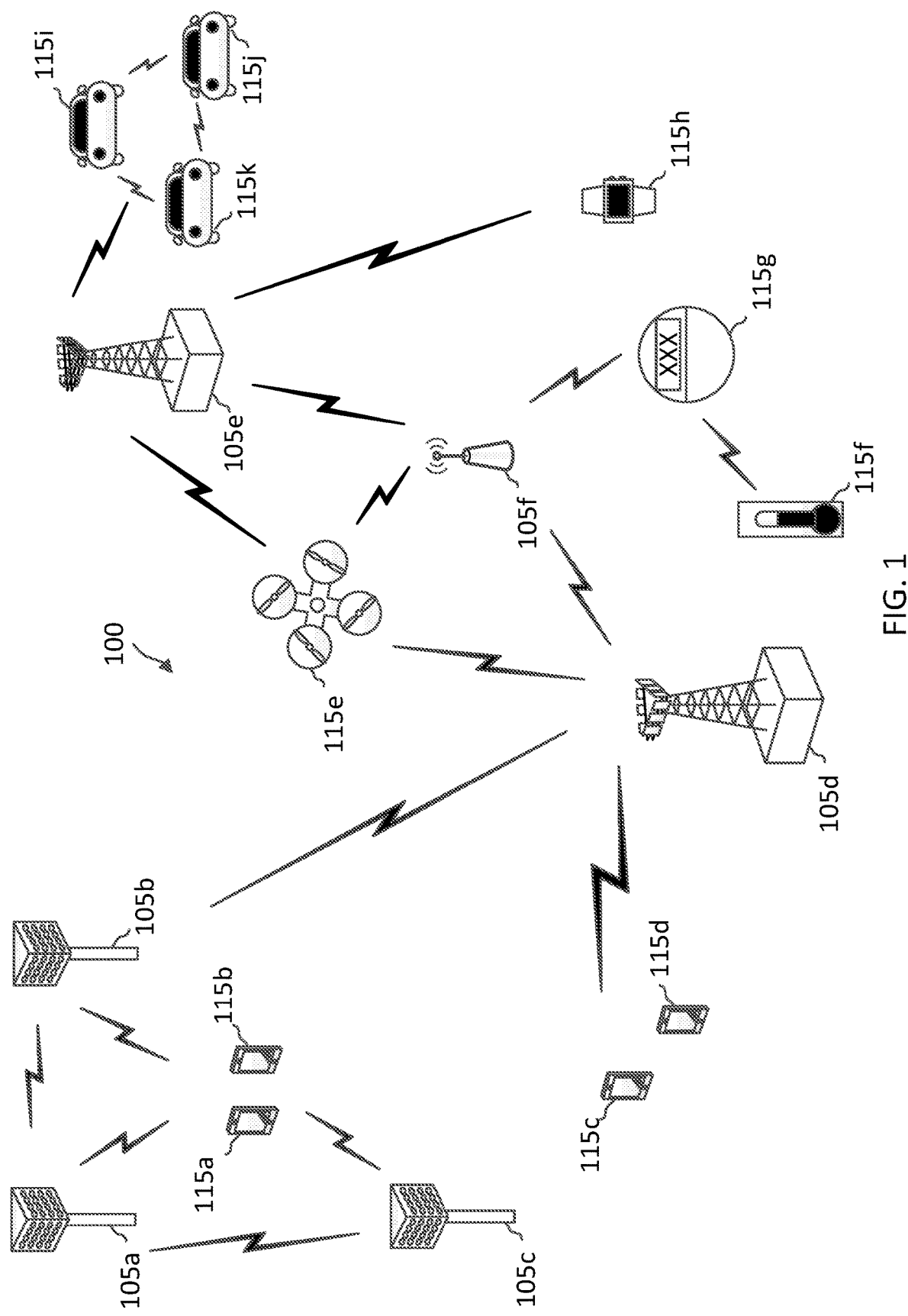
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHZ BW. For other various indoor wideband implementations, using a TDD over the unlicensed portion of the 5 GHz band, the subcarrier spacing may occur with 60 KHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHZ bands allows for hundreds of megahertz (MHz) of bandwidth (BW) available for unlicensed band communications. Additionally, NR-U may also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHZ LBT sub-bands for sidelink communications. A sidelink resource pool is typically allocated with multiple frequency subchannels within a sidelink band width part (SL-BWP) and a sidelink UE may select a sidelink resource (e.g., one or multiple subchannel) in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components performing base station functionality, may be implemented in an aggregated or disaggregated architecture. For example, a BS (such as a Node B (NB), evolved NB (CNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Various aspects relate generally to wireless communication and more particularly to signaling for dynamic waveform switching. Some aspects more specifically relate to a network unit signaling a user equipment (UE) to switch between a first waveform type and a second waveform type for uplink communications. In some examples, a network unit may transmit an indicator to the UE to enable switching between the waveform types. When waveform switching is enabled, the network unit may transmit DCI to the UE indicating which waveform type to use for uplink communications. In some examples, the size of the DCI may be the same size for the first waveform type and the second waveform type. As such, the UE may blind decode the DCI using a common DCI size for the first waveform type and the second waveform type. The DCI may further include scheduled resources for a physical uplink shared channel (PUSCH) communication associated with the UE. The UE may transmit PUSCH communications to the network unit via the scheduled resources using the indicated waveform type.

Additionally or alternatively, the UE may switch between the first waveform type and the second waveform type on a semi-static basis. In some examples, a network unit may transmit an indicator to the UE to enable switching between the waveform types. When waveform switching is enabled, the network unit may transmit non-uplink scheduling DCI and/or a MAC-CE communication to the UE indicating which waveform type to use for uplink communications. The network unit may subsequently transmit uplink scheduling DCI to the UE using a DCI size associated with the previously indicated waveform type. The DCI size associated with the first waveform type may be different from the DCI associated with the second waveform type. As such, the UE may blind decode the DCI based on the DCI size associated with the indicated waveform type. The UE may transmit PUSCH communications to the network unit via the scheduled resources using the indicated waveform type.

Particular aspects of the subject matter described in this disclosure may be implemented to realize one or more of the following potential advantages. In some examples, by implementing dynamic waveform switching according to embodiments of the present disclosure, the described techniques may be used to reduce computing resources, memory requirements, latency, and/or power consumption in the UE by blind decoding a DCI having a common size for the first and second waveform types as compared to blind decoding a first DCI associated with the first waveform type and blind decoding a second, different sized DCI associated with the second waveform type. The dynamic waveform switching according to embodiments of the present disclosure may increase network coverage and/or network capacity. For example, the UE may switch to transmitting uplink communications using a DFT-s-OFDM waveform to increase range and coverage. In some examples, the UE may switch to transmitting uplink communications using a CP-OFDM waveform to increase throughput and/or data rate.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V21) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115 may receive, from a wireless communication device located at a first distance from the UE 115, a plurality of reference signals, wherein the plurality of reference signals are associated with determining a set of phase values used over antenna elements of an antenna array for reception operations. The UE 115 may determine a first set of calibration adjustment coefficients associated with the set of phase values to be used for transmission operations from the antenna elements of the antenna array at the UE 115 to the wireless communication device located at the first distance from the UE 115. The UE 115 may transmit, to the BS 105 located at a second distance from the UE 115, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE 115, respectively.

In some aspects, the UE 115*f* may receive, from a first candidate relay UE 115*g*, a plurality of beam failure detection reference signals (BFD RSs) associated with a first plurality of beams. The UE 115*f* may detect, based on at least one BFD RS of the plurality of BFD RSs, a beam failure associated with a first beam of the first plurality of beams based on a measurement associated with the first beam. The UE 115*f* may transmit, to at least one of the first candidate relay UE 115*g* or a network unit 105, an indicator indicating the detected beam failure. Since the UE 115*f* may be mobile, the UE 115*f* may establish beamformed links with one or more active serving relay UEs and one or more candidate relay UEs. The candidate relay UEs may not be active serving relay UE(s). The beamformed links may be established with the candidate relay UEs such that when the UE 115*f* is out of coverage of the active serving relay UEs, the UE 115*f* may quickly switch to using a candidate relay UE as an active serving relay UE. In this regard, the UE 115*f* may use layer 1 (e.g., physical layer) and/or layer 2 (e.g., MAC layer) signaling to switch the candidate relays UE to an active serving relay UE. In some aspects, a first candidate relay 115*g* may receive, from a sidelink UE 115*f*, a plurality of beam failure detection reference signals (BFD RSs) associated with a plurality of beams. The UE 115*g* may detect, based on at least one BFD RS of the plurality of BFD RSs, a beam failure associated with a first beam of the plurality of beams based on a measurement associated with the first beam. The UE 115*g* may transmit, to at least one of the sidelink UE 115*f* or a BS 105, an indicator indicating the detected beam failure.

Figure 2:
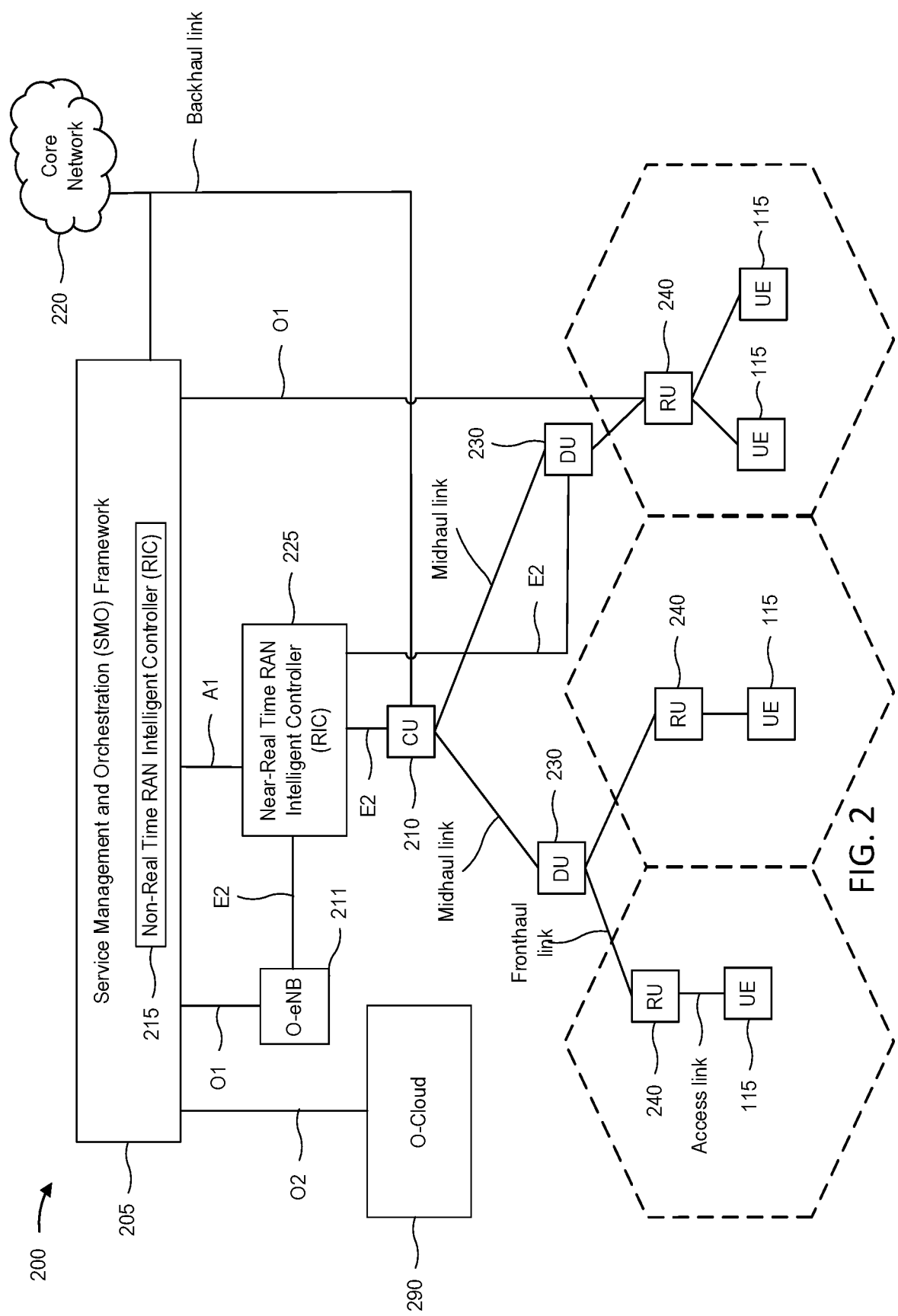
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, the UE 115 may receive, from a first candidate relay UE 115, a plurality of beam failure detection reference signals (BFD RSs) associated with a first plurality of beams. The UE 115 may detect, based on at least one BFD RS of the plurality of BFD RSs, a beam failure associated with a first beam of the first plurality of beams based on a measurement associated with the first beam. The UE 115 may transmit, to at least one of the first candidate relay UE 115 or a RU 240, an indicator indicating the detected beam failure.

In some aspects, the UE 115 may receive, from a sidelink UE 115, a plurality of beam failure detection reference signals (BFD RSs) associated with a plurality of beams. The UE 115 may detect, based on at least one BFD RS of the plurality of BFD RSs, a beam failure associated with a first beam of the plurality of beams based on a measurement associated with the first beam. The UE 115 may transmit, to at least one of the sidelink UE 115 or a RU240, an indicator indicating the detected beam failure.

Figure 3:
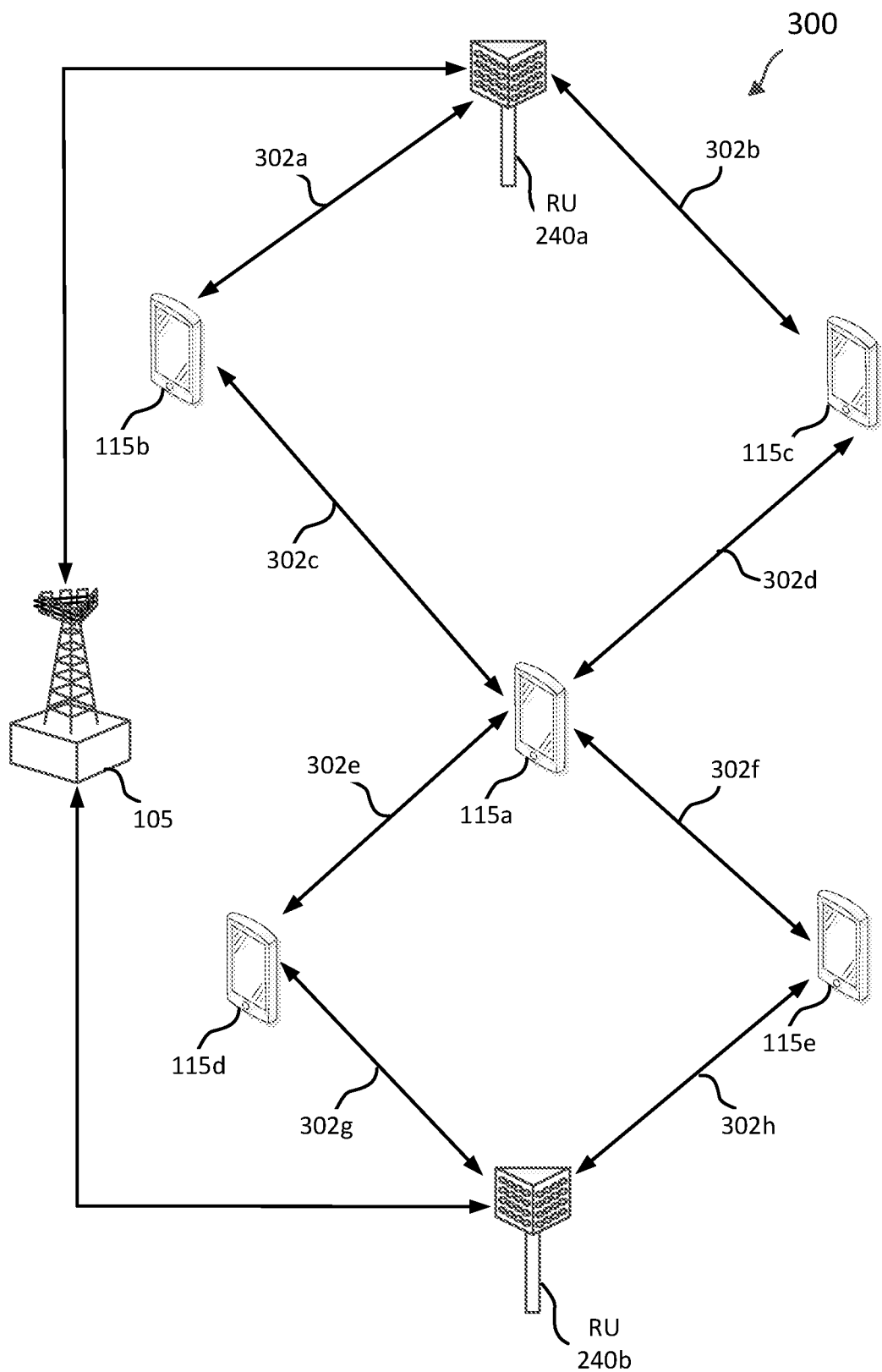
FIG. 3 illustrates a wireless communication network according to some aspects of the present disclosure.

FIG. 3 illustrates a wireless communication network 300 according to some aspects of the present disclosure. The network 300 includes a network unit 105 and other network entities such as RU 240a and RU 240b. The network 300 may include UEs 115b and 115c configured as relay UEs and UEs 115d and 115e configured as candidate relay UEs. The UE 115a may be a UE (e.g., a sidelink UE) out of coverage of the BS 105 and RUs 240a and 240b. In some aspects, the UE 115a may receive a plurality of beam failure detection reference signals (BFD RSs) from candidate relay UE 115d. In this regard, the BFD RSs may include primary sidelink synchronization signals (PSSSs), secondary sidelink synchronization signals (SSSSs), channel state information reference signals (CSI-RSs), demodulation reference signals, or other suitable reference signals. The BFD RSs may be associated with a first plurality of beams received by the UE 115a. The UE 115a may receive the plurality of BFD RSs at a millimeter wave frequency (e.g., FR2, FR3 frequencies).

The UE 115a and the UE 115d may establish a beamformed link 302e. The beamformed link 302e may be a directional link established by one more directional antennas in each of the UE 115a and the UE 115d. The beamformed link 302e may enable higher data rates for longer distances compared to non-beamformed links using omni-directional antennas. The beamformed link 302e may compensate for pathloss at higher frequencies (e.g., FR2, FR3 frequencies). As beamforming enables directional transmission between the UE 115a and the UE 115d, the beamformed link 302c between the UE 115a and the UE 115d may allow for spatial reuse of available resources due to reduced interference among the UEs.

In some aspects, the UE 115a may be out of network coverage of network unit 105 and RUs 240a and 240b. When the UE 115a is out of coverage of network unit 105, the UE 115a may use UEs 115b and/or 115c (e.g., active serving relay UEs) to relay communications to and/or from the network unit 105 using beamformed links 302c and 302d respectively. The active serving relay UE 115b and/or 115c may establish a beamformed link with the UE 115a to relay the communications to and/or from the network unit 105 using beamformed links 302a and 302b respectively. In some aspects, the out of coverage UE 115a may transmit BFD RSs to active relay UEs 115b and/or 115c. If the active relay UE 115b and/or UE 115c detects a beam failure on the out of coverage UE 115a based on measured RSRP of the BFD RSs, the active relay UE 115b and/or 115c may transmit (e.g., transmit via a random access channel RACH)) a beam failure recovery request (BFRQ) to the out of coverage UE 115a. In some aspects, the BFRQ may include a replacement beam, a reference signal ID, or an indicator of no replacement beam identified. The active relay UE 115b and/or 115c may transmit an indicator to the network unit 105 indicating the beam failure so that the network unit 105 may refrain from scheduling communications to the UE 115a through the active relay UE experiencing the beam failure until the link 302c and/or 302d is recovered. If no replacement beam for the link 302c and/or 302d is found, the link may be deactivated and the out of coverage UE 115a may start a node search procedure. If a replacement beam is found, the UE 115a and the UE 115b and/or 115c may switch to the new beam. The UE 115b and/or 115c may notify the network unit 105 that a new beam was found and the network unit may resume scheduling communications to the UE 115a through the active relay UE. Since the UE 115a may be mobile, the UE 115a may establish beamformed links with one or more active serving relay UEs 115b and/or 115c and one or more candidate relay UEs 115d and/or 115e. The candidate relay UEs 115d and/or 115e may not be active serving relay UE(s). The beamformed links 302e and 302f may be established with the candidate relay UEs 115d and/or 115e such that when the UE 115a is out of coverage of the active serving relay UEs 115b and/or 115c, the UE 115a may quickly switch to using a candidate relay UE 115d or 115e as an active serving relay UE. In this regard, the UE 115a may use layer 1 (e.g., physical layer) and/or layer 2 (e.g., MAC layer) signaling to switch the candidate relays UE 115d and/or 115e to an active serving relay UE. The candidate relays UE 115d and/or 115c may establish a beamformed link with the UE 115a to relay the communications to and/or from the network unit 105 using beamformed links 302g and 302h respectively.

In some aspects, the UE 115a may detect a beam failure associated with a first beam of the first plurality of beams from UE 115d based on a BFD RS measurement associated with the first beam. In this regard, the UE 115a may measure the reference signal received power (RSRP) of the first beam. The UE 115a may detect a failure of the first beam when the RSRP satisfies a threshold. For example, the UE 115a may detect a failure of the first beam when the RSRP of the of the first beam is equal to or below an RSRP threshold. In some aspects, the UE 115a may receive an indicator indicating the UE 115d is configured for beam failure recovery (BFR). The BFR process may detect when beam failure occurs and link 302e is lost on a first beam but is able to maintain link 302e by switching to another beam (e.g., a second beam). Beam failure detection may include a combined L1/L2 procedure where the PHY layer provides the MAC layer indications of beam failure instances (BFIs). The MAC layer may count the indications and detect a failure when a configured maximum number of BFI indications has been reached. Whenever the PHY layer of the UE 115a detects that the RSRP of the reference signal from the candidate relay UE beam goes below the threshold (e.g., 10% BLER of a hypothetical PDCCH), the UE 115a may trigger a beam failure instance (BFI) and send a BFI indicator to the MAC. The MAC layer may start a timer as soon as it receives a BFI indicator and increment a counter by 1 for every BFI. When a certain threshold number of BFIs is reached, the MAC may trigger the BFR procedure.

In some aspects, the UE 115a may transmit an indicator indicating the detected beam failure to at least one of the UE 115d or the network unit 105. In this regard, the UE 115a may transmit the indicator to the UE 115d via RRC signaling, a MAC CE communication, SCI (e.g., SCI-1, SCI-2), a PSCCH communication, a PSSCH communication, or other suitable communication. In some aspects, the UE 115a may be out of network coverage of the network unit 105. In this case, the UE 115a may transmit the indicator to an active serving relay UE 115b and/or 115c via RRC signaling, a MAC CE communication, SCI (e.g., SCI-1, SCI-2), a PSCCH communication, a PSSCH communication, or other suitable communication. The active serving relay UE 115b and/or 115c may then transmit (e.g., relay) the indicator to the network unit 105 through RU 240a using beamformed links 302a and 302b respectively. The active serving relay UE 115b and/or 115c may transmit the indicator to the network unit 105 via RRC signaling, a MAC CE communication, UCI, a PUCCH communication, a PUSCH communication, or other suitable communication. The UE 115a may be connected to one or more active serving relay UEs 115b and/or 115c when out of coverage of the network unit 105.

In some aspects, the indicator may further indicate a second beam of the plurality of beams as a replacement for the first beam. Indicating the second beam as a replacement beam may be based on a measurement associated with the second beam. For example, the UE 115a may perform measurements (e.g., RSRP measurements) on the BFD RSs received via the plurality of beams from the UE 115d. When the RSRP measurement of the second beam is higher (e.g., higher by more than a threshold) than the RSRP measurement of the first beam, the UE 115a may transmit the indicator indicating the second beam as a replacement for the first beam. When the UE 115a replaces the first beam with the second beam, the UE 115a may then monitor the BFD RSs associated with the second beam. In this regard, the UE 115a may reset the transmission configuration indicator (TCI) of the UE 115d to the replacement (e.g., second) beam. For example, the UE 115a may set its analog beamforming coefficients based on the TCI for receiving the BFD RSs associated with the second beam.

In some aspects, the UE 115a may receive BFD RSs from the UE 115d and UE 115e. For example, the UE 115a may receive a second plurality of BFD RSs from a UE 115e over beamformed link 302f. The UE 115e may not be an active serving relay UE. The UE 115e may not be configured for beam failure recovery with the UE 115a.

In some aspects, the UE 115a may be mobile. When the UE 115a is mobile, the measured signal strength of the BFD RSs transmitted by the UE 115d may vary based on the distance and/or the channel conditions between the UE 115a and the UE 115d. Similarly, the measured signal strength of the BFD RSs transmitted by the UE 115c may vary based on the distance and/or the channel conditions between the UE 115a and the UE 115e. For example, as the distance between the UE 115a and the UE 115d increases and the distance between the UE 115a and the UE 115e decreases, the measured signal strength of the BFD RSs transmitted by the UE 115d may decrease while the measured signal strength of the BFD RSs transmitted by the UE 115e may increase. In this case, the beam failure recovery process on the UE 115d may fail. The UE 115a may transmit the indicator to the network unit 105 (e.g., transmit the indicator via active serving relay UE 115b or 115c) further indicating a UE identifier associated with the UE 115e. In response to transmitting the UE 115e identifier indicating the UE 115e beam(s) have a higher signal strength, the UE 115a may receive (e.g., receive via the active serving relay UE 115b or 115c) an indicator from the network unit 105 to activate a beam failure recovery process on the UE 115c. In this regard, the UE 115a may receive the beam failure recovery process indicator from an active serving relay UE 115b or 115c via RRC signaling, a MAC CE communication, SCI (e.g., SCI-1, SCI-2), a PSCCH communication, a PSSCH communication, or other suitable communication. After receiving the indicator from the network unit 105 to activate a beam failure recovery process on the UE 115e, the UE 115a may activate the beam failure recovery process on the UE 115e. After activating the beam failure recovery process on the UE 115c, the UE 115a may deactivate the beam failure recovery process on the UE 115d. The process of activating and deactivating candidate relay UEs may continue as the distance and/or the channel conditions between the UE 115a and candidate relay UEs varies.

In some aspects, as the distance and/or the channel conditions between the UE 115a and the active serving relay UE(s) 115b and 115c varies, the network unit 105 may replace an active serving relay UE with a candidate relay UE after the above process is completed. The UE 115a may report RSRP measurements associated with BFD RSs from candidate relay UEs 115d and 115c and active serving relay UEs 115b and 115c. For example, the network unit 105 may determine to replace active serving relay UE 115b with candidate relay UE 115d. In this regard, the network unit 105 may transmit an indicator to the UE 115a to configure candidate relay UE 115d as an active serving relay UE.

Figure 4:
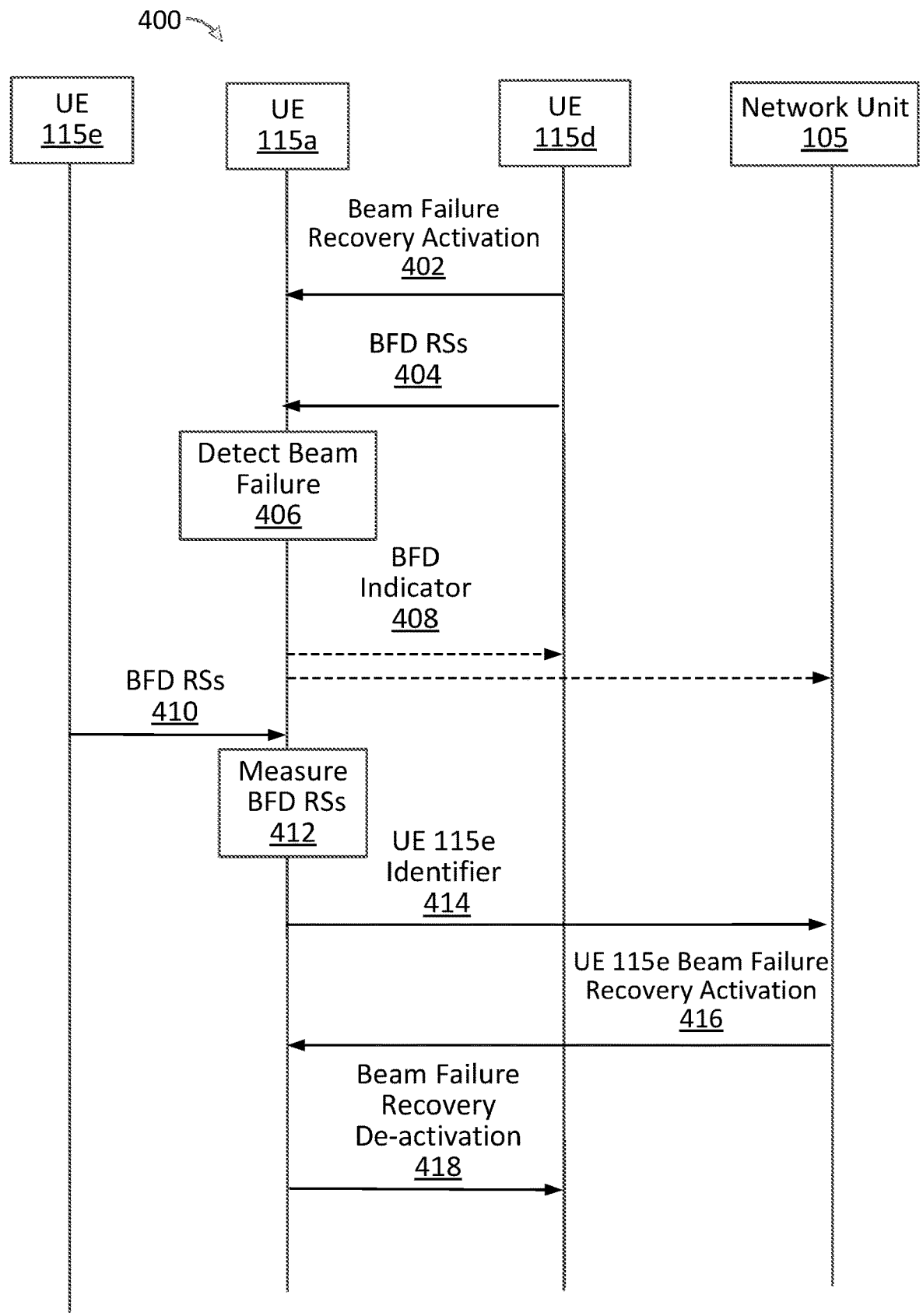
FIG. 4 is a signal flow diagram of a communication method according to some aspects of the present disclosure.

FIG. 4 is a flow diagram of a communication method 400 according to some aspects of the present disclosure. Aspects of the method 400 may be executed by a computing device (e.g., a processor, processing circuit, and/or other suitable component) of a wireless communication device or other suitable means for performing the actions. For example, a wireless communication device, such as the UE 115 or the UE 600 may utilize one or more components, such as the processor 602, the memory 604, the sidelink beam failure recovery module 608, the transceiver 610, the modem 612, and the one or more antennas 616, to execute aspects of method 400. The method 400 may employ similar mechanisms as in the networks 100, 200, and 300 and the aspects and actions described with respect to FIG. 3. As illustrated, the method 400 includes a number of enumerated actions, but the method 400 may include additional actions before, after, and in between the enumerated actions. In some aspects, one or more of the enumerated actions may be omitted or performed in a different order.

At action 402, the method 400 includes the UE 115a receiving a beam failure recovery activation from the UE 115d. In this regard, the beam failure recovery activation may activate a beam failure recovery process between the UE 115a and the UE 115d.

At action 404, the method 400 includes the UE 115a receiving a plurality of beam failure detection reference signals (BFD RSs) from UE 115d (e.g. a candidate relay UE). In this regard, the BFD RSs may include primary sidelink synchronization signals (PSSSs), secondary sidelink synchronization signals (SSSSs), channel state information reference signals (CSI-RSs), sounding reference signals (SRSs), demodulation reference signals (DMRSs), phase tracking reference signals (PTRSs), or other suitable reference signals. The BFD RSs may be associated with a first plurality of beams received by the UE 115a. The sidelink UE may receive the plurality of BFD RSs at a millimeter wave frequency (e.g., FR2, FR3 frequencies).

The UE 115a and the UE 115d may establish a beamformed link. The beamformed link may be a directional link established by one more directional antennas in each of the UE 115a and the UE 115d. In some aspects, the UE 115a may be out of network coverage of network unit 105. When the UE 115a is out of coverage of network unit 105, the UE 115a may use other sidelink UEs (e.g., active serving relay UEs) to relay communications to and/or from the network unit 105.

At action 406, the method 400 includes the UE 115a detecting a beam failure associated with a first beam of the first plurality of beams based on a BFD RS measurement associated with the first beam. In this regard, the UE 115a may measure the reference signal received power (RSRP) of the first beam. The UE 115a may detect a failure of the first beam when the RSRP satisfies a threshold. For example, the UE 115a may detect a failure of the first beam when the RSRP of the of the first beam is equal to or below an RSRP threshold.

At action 408, the method 400 includes the UE 115a transmitting an indicator indicating the detected beam failure to at least one of the UE 115d or the network unit 105. In this regard, the UE 115a may transmit the indicator to the UE 115d via RRC signaling, a MAC CE communication, SCI (e.g., SCI-1, SCI-2), a PSCCH communication, a PSSCH communication, or other suitable communication. In some aspects, the UE 115a may be out of network coverage of the network unit 105. In this case, the UE 115a may transmit the indicator to an active serving relay UE via RRC signaling, a MAC CE communication, SCI (e.g., SCI-1, SCI-2), a PSCCH communication, a PSSCH communication, or other suitable communication. The active serving relay UE may then transmit (e.g., relay) the indicator to the network unit 105 via RRC signaling, a MAC CE communication, UCI, a PUCCH communication, a PUSCH communication, or other suitable communication.

In some aspects, the indicator may further indicate a second beam of the plurality of beams as a replacement for the first beam. Indicating the second beam as a replacement beam may be based on a measurement associated with the second beam. For example, the UE 115a may perform measurements (e.g., RSRP measurements) on the BFD RSs received via the plurality of beams from the UE 115d. When the RSRP measurement of the second beam is higher (e.g., higher by more than a threshold) than the RSRP measurement of the first beam, the UE 115a may transmit the indicator indicating the second beam as a replacement for the first beam. When the UE 115a replaces the first beam with the second beam, the UE 115a may then monitor the BFD RSs associated with the second beam. In this regard, the UE 115a may reset the transmission configuration indicator (TCI) of the UE 115d to the replacement (e.g., second) beam.

At action 410, the method 400 includes the UE 115a receiving a second plurality of BFD RSs from the UE 115c (e.g., a candidate relay UE). The UE 115e may not be an active serving relay UE. The UE 115e may not be configured for beam failure recovery with the UE 115a.

At action 412, the method 400 includes the UE 115a measuring the second plurality of BFD RSs from the UE 115e. In some aspects, the UE 115a may be mobile. When the UE 115a is mobile, the measured signal strength of the BFD RSs transmitted by the UE 115d may vary based on the distance and/or the channel conditions between the UE 115a and the UE 115d. Similarly, the measured signal strength of the BFD RSs transmitted by the UE 115e may vary based on the distance and/or the channel conditions between the UE 115a and the UE 115c. For example, as the distance between the UE 115a and the UE 115d increases and the distance between the UE 115a and the UE 115e decreases, the measured signal strength of the BFD RSs transmitted by the UE 115d may decrease while the measured signal strength of the BFD RSs transmitted by the UE 115e may increase. In this case, a beam failure may be detected and the beam failure recovery process on the UE 115d may fail.

At action 414, the method 400 includes the UE 115a transmitting the indicator to the network unit 105 further indicating a UE identifier associated with the UE 115c. The UE 115a may transmit the indicator to the network unit 105 further indicating the UE identifier associated with the UE 115e using an active relay UE.

At action 416, the method 400 includes the UE 115a receiving (e.g., receive via the active serving relay UE) an indicator from the network unit 105 to activate a beam failure recovery process on the UE 115e. In this regard, the UE 115a may receive the beam failure recovery process indicator from the network unit 105 via an active serving relay UE using RRC signaling, a MAC CE communication, SCI (e.g., SCI-1, SCI-2), a PSCCH communication, a PSSCH communication, or other suitable communication. After receiving the indicator from the network unit 105 to activate a beam failure recovery process on the UE 115e, the UE 115a may activate the beam failure recovery process on the UE 115e.

At action 418, the method 400 includes the UE 115a transmitting an indicator to the UE 115d to deactivate the beam failure recovery process on the UE 115d. The UE 115a may autonomously deactivate the beam failure recovery process on the UE 115d after activating the beam failure recovery process on the UE 115e. In some aspects, the network unit may transmit an indicator to the UE 115d to deactivate the beam failure recovery process on the UE 115d. The process of activating and deactivating candidate relay UEs may continue as the distance and/or the channel conditions between the UE 115a and candidate relay UEs varies.

Figure 5:
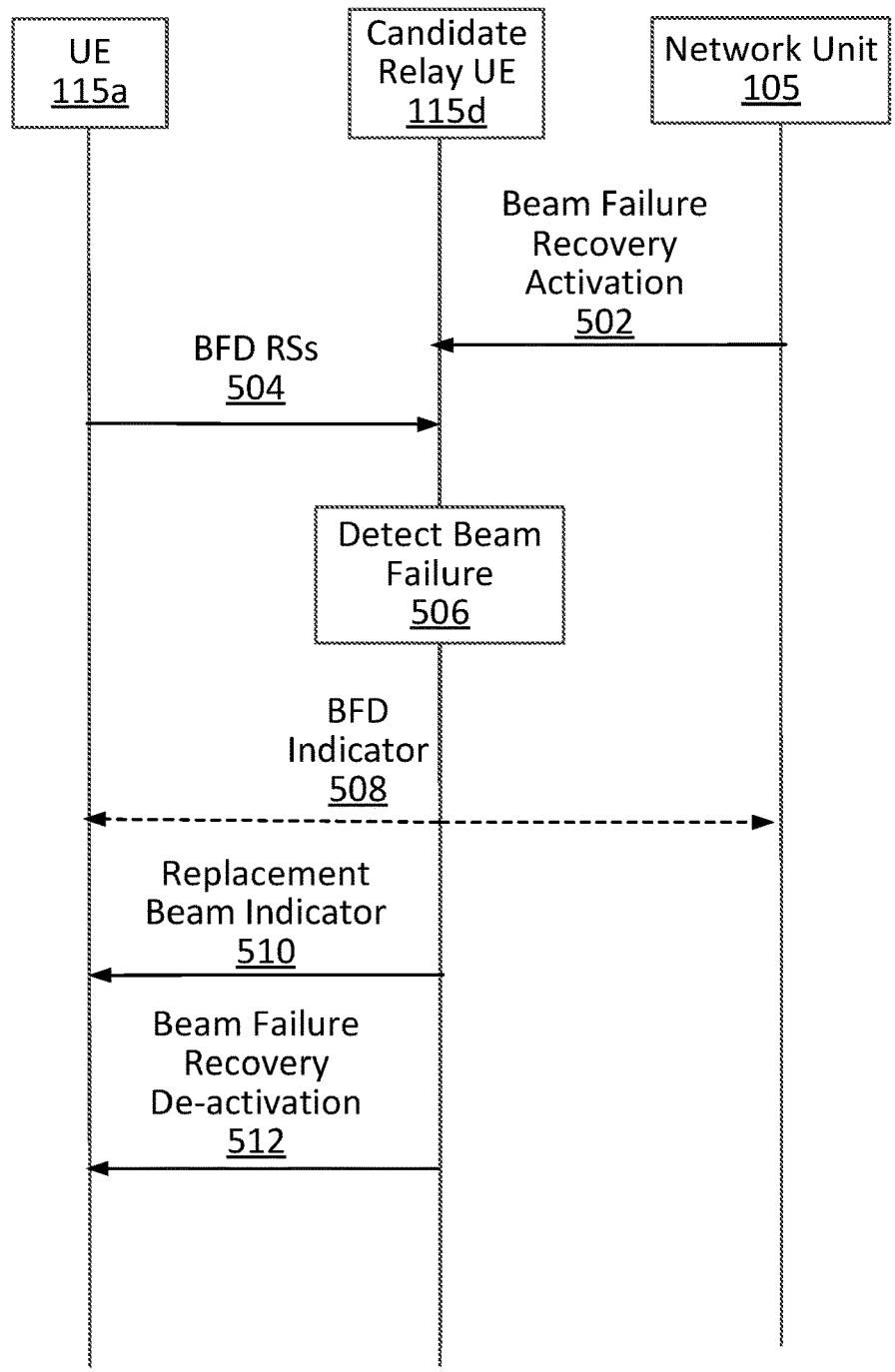
FIG. 5 is a signal flow diagram of a communication method according to some aspects of the present disclosure.

FIG. 5 is a flow diagram of a communication method 500 according to some aspects of the present disclosure. Aspects of the method 500 may be executed by a computing device (e.g., a processor, processing circuit, and/or other suitable component) of a wireless communication device or other suitable means for performing the actions. For example, a wireless communication device, such as the UE 115 or the UE 600 may utilize one or more components, such as the processor 602, the memory 604, the sidelink beam failure recovery module 608, the transceiver 610, the modem 612, and the one or more antennas 616, to execute aspects of method 500. The method 500 may employ similar mechanisms as in the networks 100, 200, and 300 and the aspects and actions described with respect to FIG. 3. As illustrated, the method 500 includes a number of enumerated actions, but the method 500 may include additional actions before, after, and in between the enumerated actions. In some aspects, one or more of the enumerated actions may be omitted or performed in a different order.

At action 502, the method 500 includes the UE 115d receiving a beam failure recovery activation from the network unit 105. In this regard, the beam failure recovery activation may activate a beam failure recovery process between the UE 115a and the UE 115d.Since the UE 115a may be mobile, the UE 115a may establish beamformed links with one or more active serving relay UEs and candidate relay UE 115d. The UE 115a may have an established beamformed link with the candidate relay UE 115d such that when the UE 115a is out of coverage of the active serving relay UEs, the UE 115a may quickly switch to using candidate relay UE 115d as an active serving relay UE. In this regard, the UE 115a may use layer 1 (e.g., physical layer) and/or layer 2 (e.g., MAC layer) signaling to switch candidate relay UE 115d to an active serving relay UE.

At action 504, the method 500 includes the UE 115d receiving a plurality of beam failure detection reference signals (BFD RSs) from UE 115a. In this regard, the BFD RSs may include primary sidelink synchronization signals (PSSSs), secondary sidelink synchronization signals (SSSSs), channel state information reference signals (CSI-RSs), sounding reference signals (SRSs), demodulation reference signals (DMRSs), phase tracking reference signals (PTRSs), or other suitable reference signals. The BFD RSs are received by the UE 115d and these BFD RSs are associated with beams. The UE 115d may receive the plurality of BFD RSs from UE 115a at a millimeter wave frequency (e.g., FR2, FR3 frequencies).

The UE 115a and the UE 115d may establish a beamformed link. The beamformed link may be a directional link established by one more directional antennas in each of the UE 115a and the UE 115d. In some aspects, the UE 115a may be out of network coverage of network unit 105. When the UE 115a is out of coverage of network unit 105, the UE 115a may use other sidelink UEs (e.g., active serving relay UEs) to relay communications to and/or from the network unit 105.

At action 506, the method 500 includes the UE 115d detecting a beam failure associated with a first beam of the first plurality of beams based on a BFD RS measurement associated with the first beam. In this regard, the UE 115d may measure the reference signal received power (RSRP) of the first beam. The UE 115d may detect a failure of the first beam when the RSRP satisfies a threshold. For example, the UE 115d may detect a failure of the first beam when the RSRP of the of the first beam is equal to or below an RSRP threshold.

At action 508, the method 500 includes the UE 115d transmitting an indicator indicating the detected beam failure to at least one of the UE 115a or the network unit 105. In this regard, the UE 115d may transmit the indicator to the UE 115a via RRC signaling, a MAC CE communication, SCI (e.g., SCI-1, SCI-2), a PSCCH communication, a PSSCH communication, or other suitable communication. The UE 115d may transmit (e.g., relay) the indicator to the network unit 105 further indicating that the current candidate link will not be used before the link is recovered via RRC signaling, a MAC CE communication, UCI, a PUCCH communication, a PUSCH communication, or other suitable communication.

At action 510, the method 500 includes the UE 115d transmitting an indicator to the UE 115a indicating a second beam of the plurality of beams as a replacement for the first beam. Indicating the second beam as a replacement beam may be based on a measurement associated with the second beam. For example, the UE 115d may perform measurements (e.g., RSRP measurements) on the BFD RSs received via the plurality of beams from the UE 115a. When the RSRP measurement of the second beam is higher (e.g., higher by more than a threshold) than the RSRP measurement of the first beam, the UE 115*d* may transmit the indicator indicating the second beam as a replacement for the first beam. When the UE 115*d* replaces the first beam with the second beam, the UE 115*d* may then monitor the BFD RSs associated with the second beam. In this regard, the UE 115*d* may reset the transmission configuration indicator (TCI) of the UE 115*a* to the replacement (e.g., second) beam.

At action 512, the method 500 includes the UE 115*d* transmitting an indicator to the UE 115*a* to deactivate the BFR process on the UE 115*a*. The UE 115*d* may autonomously transmit the indicator to deactivate the beam failure recovery process on the UE 115*a* based on the BFR process running on the UE 115*d* being unable to determine a satisfactory replacement beam.

Figure 6:
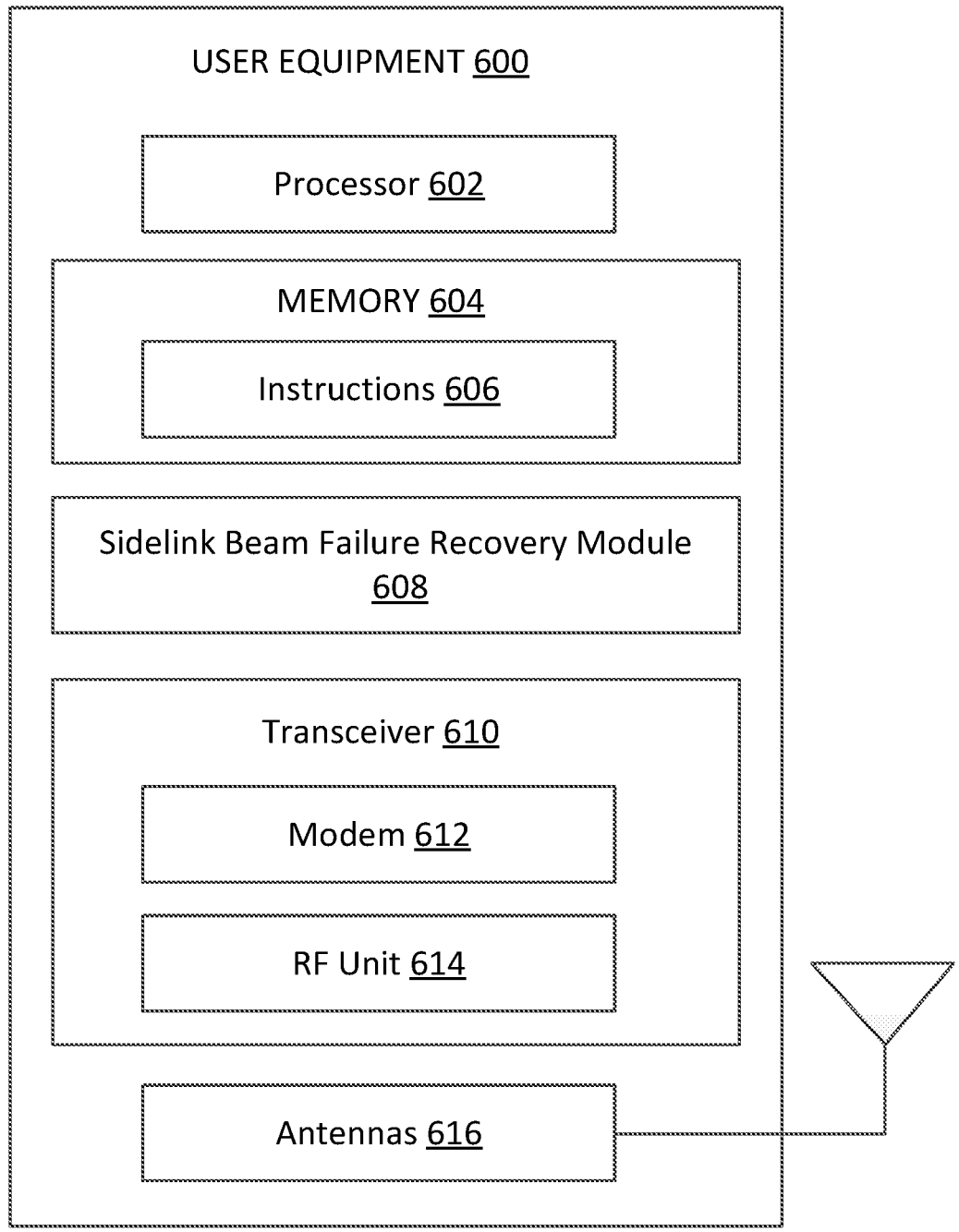
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100, or 200 as discussed above. As shown, the UE 600 may include a processor 602, a memory 604, a sidelink beam failure recovery module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 3-5. Instructions 606 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink beam failure recovery module 608 may be implemented via hardware, software, or combinations thereof. For example, the sidelink beam failure recovery module 608 may be implemented as a processor, circuit, and/or instructions 606 stored in the memory 604 and executed by the processor 602. In some aspects, the sidelink beam failure recovery module 608 may implement the aspects of FIGS. 3-5. For example, the sidelink beam failure recovery module 608 may receive, from a first candidate relay UE 600, a plurality of beam failure detection reference signals (BFD RSs) associated with a first plurality of beams. The sidelink beam failure recovery module 608 may detect, based on at least one BFD RS of the plurality of BFD RSs, a beam failure associated with a first beam of the first plurality of beams based on a measurement associated with the first beam. The sidelink beam failure recovery module 608 may transmit, to at least one of the first candidate relay UE 600 or a network unit 700, an indicator indicating the detected beam failure.

In some aspects, the sidelink beam failure recovery module 608 may receive, from a wireless communication device located at a first distance from the UE 600, a plurality of first reference signals. The sidelink beam failure recovery module 608 may receive, from the wireless communication device located at a second distance from the UE 600, a plurality of second reference signals, wherein the plurality of first reference signals and the plurality of second reference signals are associated with determining a set of phase values used over antenna elements of an antenna array for reception operations. The sidelink beam failure recovery module 608 may determine a first set of calibration adjustment coefficients associated with the set of phase values to be used for transmission operations from the antenna elements of the antenna array at the UE 600 to the wireless communication device located at the first distance from the UE 600. The sidelink beam failure recovery module 608 may determine a second set of calibration adjustment coefficients associated with the set of phase values to be used for transmission operations from the antenna elements of the antenna array at the UE 600 to the wireless communication device located at the second distance from the UE 600. The sidelink beam failure recovery module 608 may transmit, to a network unit located at a second distance from the UE 600, a communication signal with phase values based on at least one of the first set of calibration adjustment coefficients or the second set of calibration adjustment coefficients.

As shown, the transceiver 610 may include the modem subsystem 612 and the RF unit 614. The transceiver 610 may be configured to communicate bi-directionally with other devices, such as the BSs 105 and/or the UEs 115. The modem subsystem 612 may be configured to modulate and/or encode the data from the memory 604 and the according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 may include multiple transceivers 610 implementing different RATs (e.g., NR and LTE). In some instances, the UE 600 may include a single transceiver 610 implementing multiple RATs (e.g., NR and LTE). In some instances, the transceiver 610 may include various components, where different combinations of components may implement RATs.

Figure 7:
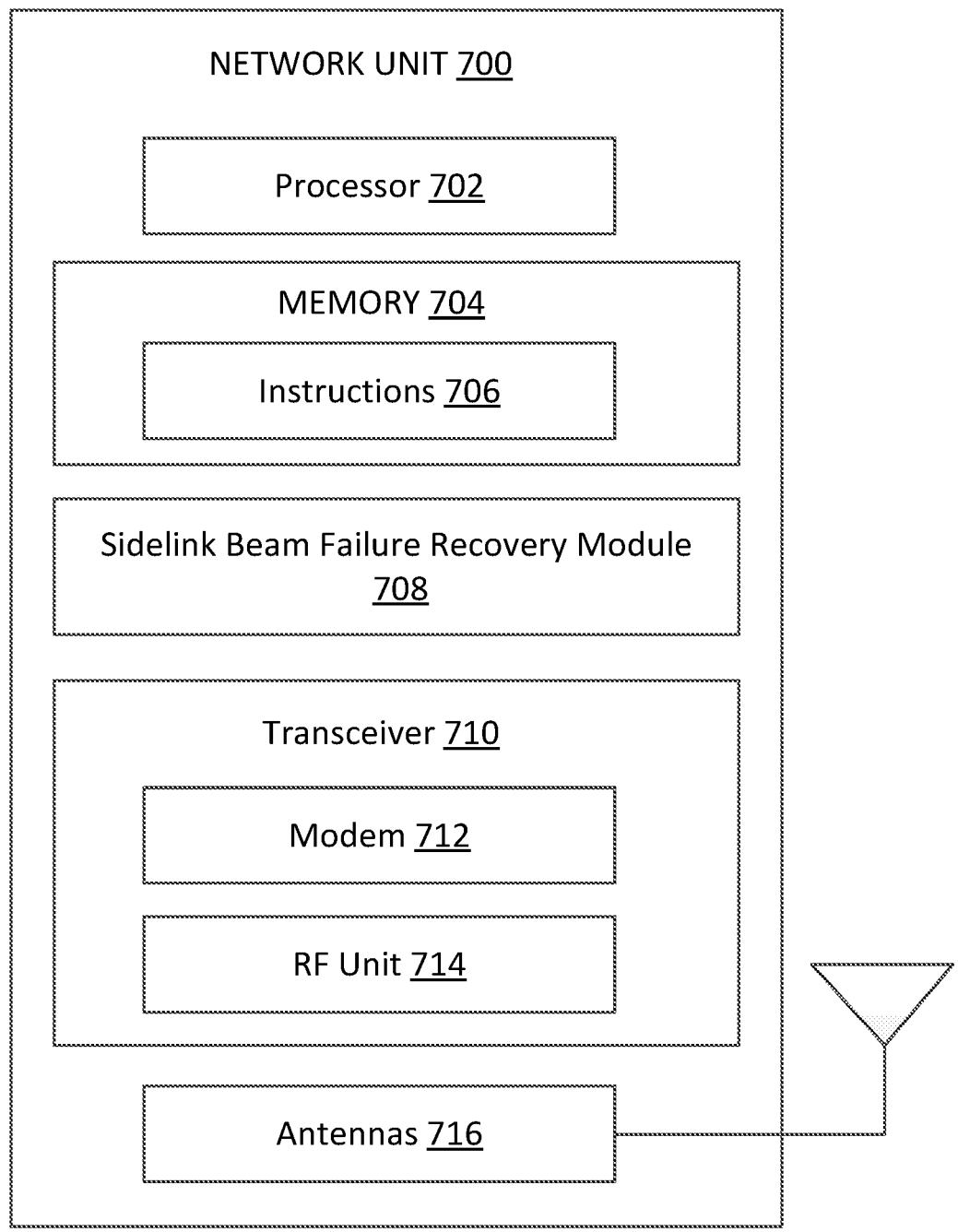
FIG. 7 is a block diagram of an exemplary network unit according to some aspects of the present disclosure.

FIG. 7 is a block diagram of an exemplary network unit 700 according to some aspects of the present disclosure. The network unit 700 may be the BS 105, the CU 210, the DU 230, or the RU 240, as discussed above. As shown, the network unit 700 may include a processor 702, a memory 704, a sidelink beam failure recovery module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 3-5. Instructions 706 may also be referred to as code, which may be interpreted broadly to include any type of computer-readable statement(s).

The sidelink beam failure recovery module 708 may be implemented via hardware, software, or combinations thereof. For example, the sidelink beam failure recovery module 708 may be implemented as a processor, circuit, and/or instructions 706 stored in the memory 704 and executed by the processor 702.

In some aspects, the sidelink beam failure recovery module 708 may implement the aspects of FIGS. 3-5. For example, the sidelink beam failure recovery module 708 may receive, from a UE 600, an indicator indicating a detected beam failure in a first candidate relay UE 600. The sidelink beam failure recovery module 708 may transmit an indicator to deactivate beam failure recovery on the first candidate relay UE 600 and activate beam failure recovery on a second candidate relay UE 600. Additionally or alternatively, the sidelink beam failure recovery module 708 may be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 may be configured to communicate bi-directionally with other devices, such as the UEs 115 and/or UE 800. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 800. The RF unit 714 may be further configured to perform analog beamforming in conjunction with the digital beamforming. Although shown as integrated together in transceiver 710, the modem subsystem 712 and/or the RF unit 714 may be separate devices that are coupled together at the network unit 700 to enable the network unit 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the network unit 700 may include multiple transceivers 710 implementing different RATs (e.g., NR and LTE). In some instances, the network unit 700 may include a single transceiver 710 implementing multiple RATs (e.g., NR and LTE). In some instances, the transceiver 710 may include various components, where different combinations of components may implement RATs.

Figure 8:
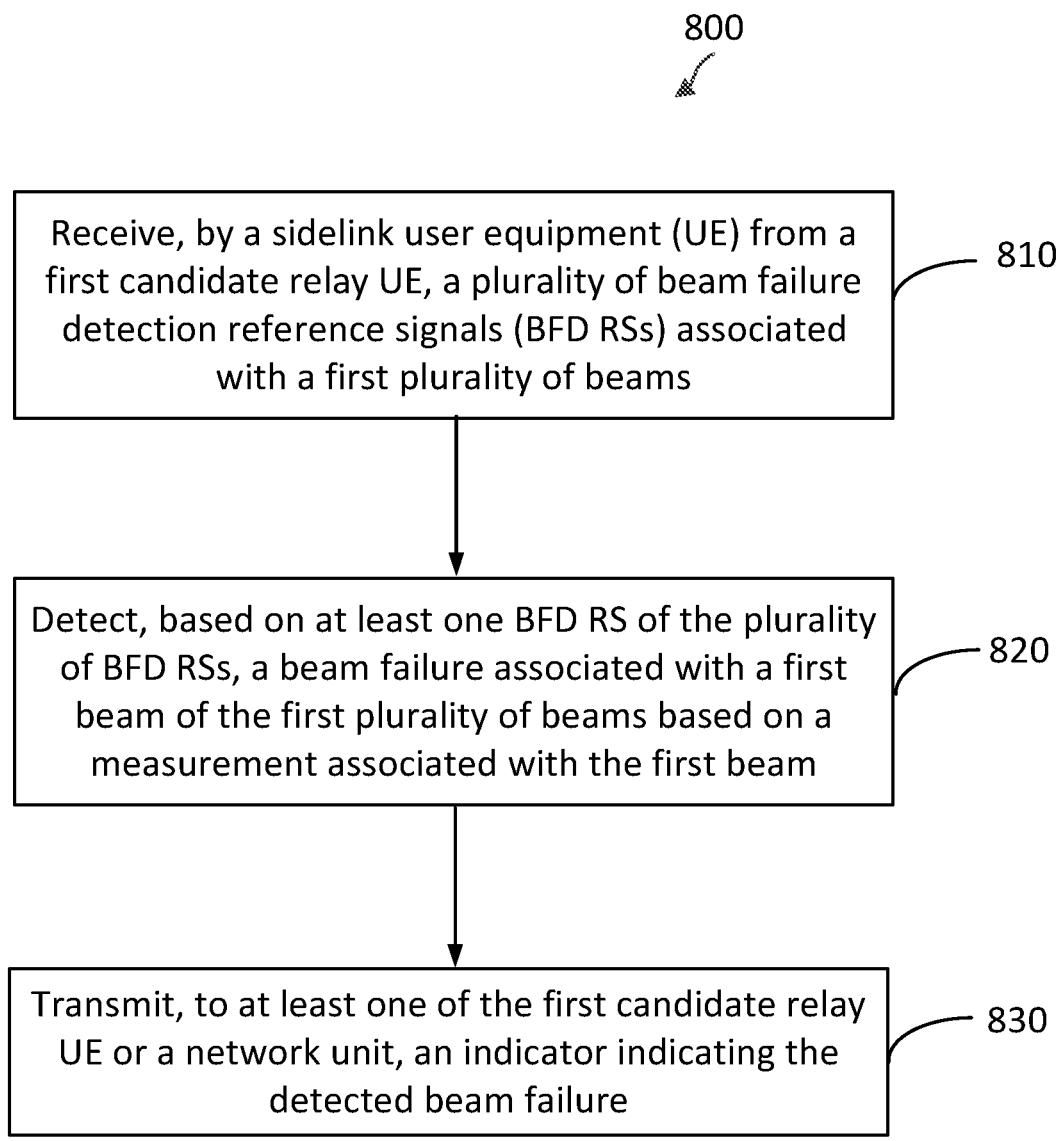
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the aspects. For example, a wireless communication device, such as the UE 115 or UE 600 may utilize one or more components to execute aspects of method 800. The method 800 may employ similar mechanisms as in the networks 100, 200, and 300 and the aspects and actions described with respect to FIGS. 2-5. For example, a wireless communication device, such as the UE 115 or UE 600, may utilize one or more components, such as such as the processor 602, the memory 604, the sidelink beam failure recovery module 608, the transceiver 610, the modem 612, and the one or more antennas 616, to execute aspects of the method 800. As illustrated, the method 800 includes a number of enumerated aspects, but the method 800 may include additional aspects before, after, and in between the enumerated aspects. In some aspects, one or more of the enumerated aspects may be omitted or performed in a different order.

At action 810, the method 800 includes a sidelink UE (e.g., the UE 115 or UE 600) receiving a plurality of beam failure detection reference signals (BFD RSs) from a first candidate relay UE. In this regard, the BFD RSs may include primary sidelink synchronization signals (PSSSs), secondary sidelink synchronization signals (SSSSs), channel state information reference signals (CSI-RSs), demodulation reference signals, or other suitable reference signals. The BFD RSs may be associated with a first plurality of beams received by the sidelink UE. The sidelink UE may receive the plurality of BFD RSs at a millimeter wave frequency (e.g., FR2, FR3 frequencies).

The sidelink UE and the first candidate relay UE may establish a beamformed link. The beamformed link may be a directional link established by one more directional antennas in each of the sidelink UE and the first candidate relay UE. The beamformed link may enable higher data rates for longer distances compared to non-beamformed links using omni-directional antennas. The beamformed link may compensate for pathloss at higher frequencies (e.g., FR2, FR3 frequencies). As beamforming enables directional transmission between the sidelink UE and the first candidate relay UE, the beamformed link between the sidelink UE and the first candidate relay UE may allow for spatial reuse of available resources due to reduced interference among the UEs.

In some aspects, the sidelink UE may be out of network coverage of a network unit (e.g. the BS 105, the CU 210, the DU 230, the RU 240, and/or network unit 700). When the sidelink UE is out of coverage of a network unit, the sidelink UE may use other sidelink UEs (e.g., active serving relay UEs) to relay communications to and/or from the network unit. The active serving relay UE(s) may establish a beamformed link with the sidelink UE to relay the communications to and/or from the network unit. Since the sidelink UE may be mobile, the sidelink UE may establish beamformed links with one or more active serving relay UEs and one or more candidate relay UEs. The candidate relay UE(s) may not be active serving relay UE(s). The beamformed links may be established with the candidate relay UE(s) such that when the sidelink UE is out of coverage of the active serving relay UE(s), the sidelink UE may quickly switch to using a candidate relay UE as an active serving relay UE. In this regard, the sidelink UE may use layer 1 (e.g., physical layer) and/or layer 2 (e.g., MAC layer) signaling to switch the candidate relay UE to an active serving relay UE.

At action 820, the method 800 includes the sidelink UE detecting a beam failure associated with a first beam of the first plurality of beams based on a BFD RS measurement associated with the first beam. In this regard, the sidelink UE may measure the reference signal received power (RSRP) of the first beam. The sidelink UE may detect a failure of the first beam when the RSRP satisfies a threshold. For example, the sidelink UE may detect a failure of the first beam when the RSRP of the of the first beam is equal to or below an RSRP threshold. In some aspects, the sidelink UE may receive an indicator indicating the first candidate relay UE is configured for beam failure recovery (BFR). The BFR process may detect when beam failure occurs and the link is lost on a first beam but is able to maintain the link by switching to another beam (e.g., a second beam). Beam failure detection may include a combined L1/L2 procedure where the PHY layer provides the MAC layer indications of beam failure instances (BFIs). The MAC layer may count the indications and detect a failure when a configured maximum number of BFI indications has been reached. Whenever the PHY layer of the sidelink UE detects that the RSRP of the reference signal from the candidate relay UE beam goes below the threshold (e.g., 10% BLER of a hypothetical PDCCH), the sidelink UE may trigger a beam failure instance (BFI) and send a BFI indicator to the MAC. The MAC layer may start a timer as soon as it receives a BFI indicator and increment a counter by 1 for every BFI. When a certain threshold number of BFIs is reached, the MAC may trigger the BFR procedure.

At action 830, the method 800 includes the sidelink UE transmitting an indicator indicating the detected beam failure to at least one of the first candidate relay UE or a network unit. In this regard, the sidelink UE may transmit the indicator to the first candidate relay UE via RRC signaling, a MAC CE communication, SCI (e.g., SCI-1, SCI-2), a PSCCH communication, a PSSCH communication, or other suitable communication. In some aspects, the sidelink UE may be out of network coverage of the network unit. In this case, the sidelink UE may transmit the indicator to an active serving relay UE via RRC signaling, a MAC CE communication, SCI (e.g., SCI-1, SCI-2), a PSCCH communication, a PSSCH communication, or other suitable communication. The active serving relay UE may then transmit (e.g., relay) the indicator to the network unit via RRC signaling, a MAC CE communication, UCI, a PUCCH communication, a PUSCH communication, or other suitable communication. The sidelink UE may be connected to one or more active serving relay UEs when out of coverage of the network unit.

In some aspects, the indicator may further indicate a second beam of the plurality of beams as a replacement for the first beam. Indicating the second beam as a replacement beam may be based on a measurement associated with the second beam. For example, the sidelink UE may perform measurements (e.g., RSRP measurements) on the BFD RSs received via the plurality of beams from the first candidate relay UE. When the RSRP measurement of the second beam is higher (e.g., higher by more than a threshold) than the RSRP measurement of the first beam, the sidelink UE may transmit the indicator indicating the second beam as a replacement for the first beam. When the sidelink UE replaces the first beam with the second beam, the sidelink UE may then monitor the BFD RSs associated with the second beam. In this regard, the sidelink UE may reset the transmission configuration indicator (TCI) of the first candidate relay UE to the replacement (e.g., second) beam. For example, the sidelink UE may set its analog beamforming coefficients based on the TCI for receiving the BFD RSs associated with the second beam.

In some aspects, the sidelink UE may receive BFD RSs from the first candidate relay UE and one or more additional candidate relay UEs. For example, the sidelink UE may receive a second plurality of BFD RSs from a second candidate relay UE. The second candidate relay UE may not be an active serving relay UE. The second candidate relay UE may not be configured for beam failure recovery with the sidelink UE.

In some aspects, the sidelink UE may be mobile. When the sidelink UE is mobile, the measured signal strength of the BFD RSs transmitted by the first candidate relay UE may vary based on the distance and/or the channel between the sidelink UE and the first candidate relay UE. Similarly, the measured signal strength of the BFD RSS transmitted by the second candidate relay UE may vary based on the distance and/or the channel between the sidelink UE and the second candidate relay UE. For example, as the distance between the sidelink UE and the first candidate relay UE increases and the distance between the sidelink UE and the second candidate relay UE decreases, the measured signal strength of the BFD RSs transmitted by the first candidate relay UE may decrease while the measured signal strength of the BFD RSs transmitted by the second candidate relay UE may increase. In this case, the beam failure recovery process on the first candidate relay UE may fail. The sidelink UE may transmit the indicator to the network unit (e.g., transmit the indicator via an active serving relay UE) further indicating a UE identifier associated with the second candidate relay UE. In response to transmitting the second candidate relay UE identifier indicating the second candidate relay UE has a higher signal strength, the sidelink UE may receive (e.g., receive via the active serving relay UE) an indicator from the network unit to activate a beam failure recovery process on the second candidate relay UE. In this regard, the sidelink UE may receive the beam failure recovery process indicator from an active serving relay UE via RRC signaling, a MAC CE communication, SCI (e.g., SCI-1, SCI-2), a PSCCH communication, a PSSCH communication, or other suitable communication. After receiving the indicator from the network unit to activate a beam failure recovery process on the second candidate relay UE, the sidelink UE may activate the beam failure recovery process on the second candidate relay UE. After activating the beam failure recovery process on the second candidate relay UE, the sidelink UE may deactivate the beam failure recovery process on the first candidate relay UE. The process of activating and deactivating candidate relay UEs may continue as the distance and/or the channel between the sidelink UE and candidate relay UEs varies.

In some aspects, as the distance and/or the channel between the sidelink UE and the active serving relay UE(s) varies, the network unit may replace an active serving relay UE with a candidate relay UE after actions 810 to 830 are completed. For example, the sidelink UE may report RSRP measurements associated with BFD RSs from candidate relay UE(s) and active serving relay UE(s). The network unit may determine to replace an active serving relay UE with a candidate relay UE. In this regard, the network unit may transmit an indicator to the sidelink UE to configure a candidate relay UE as an active serving relay UE.

Figure 9:
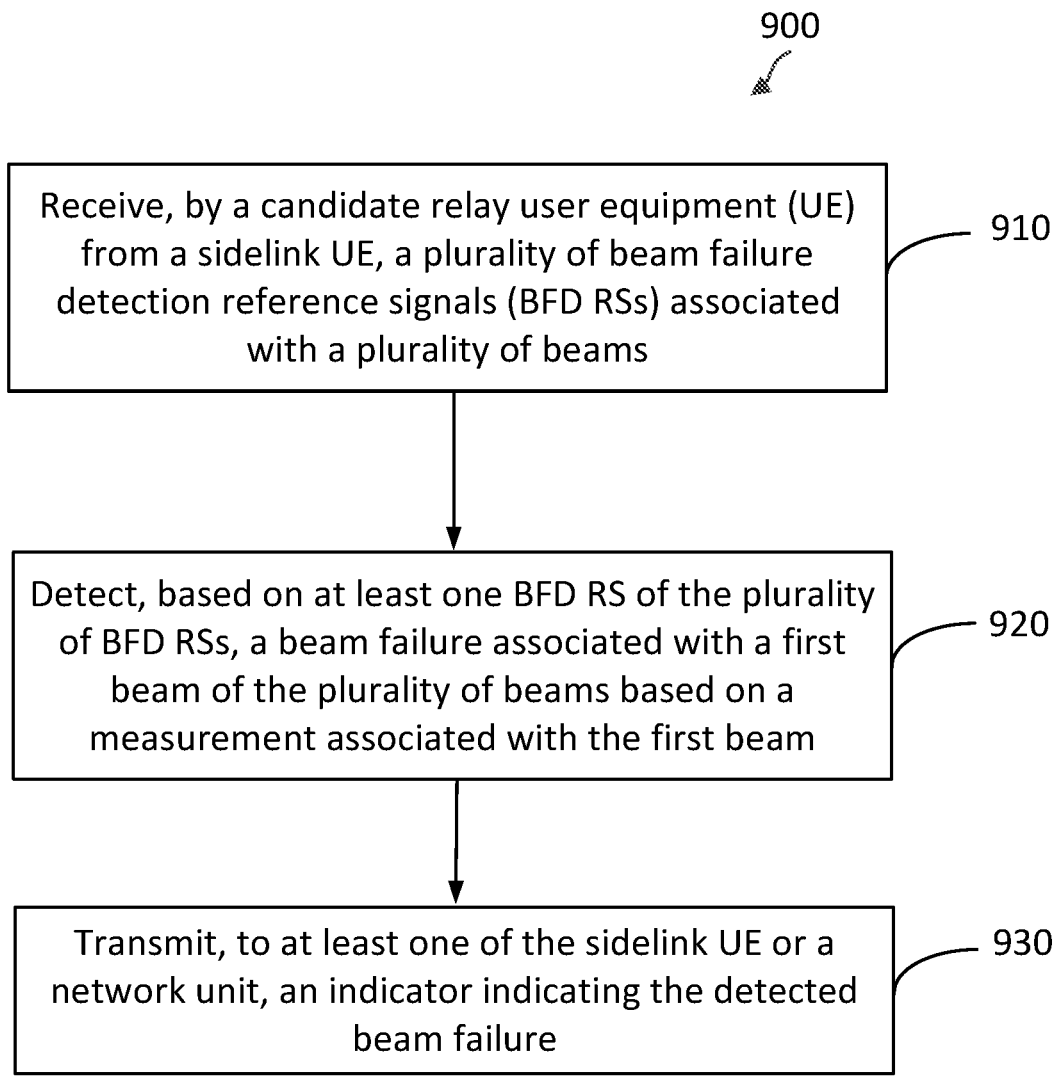
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the aspects. For example, a wireless communication device, such as the UE 115 or UE 600 may utilize one or more components to execute aspects of method 900. The method 900 may employ similar mechanisms as in the networks 100, 200, and 300 and the aspects and actions described with respect to FIGS. 2-5. For example, a wireless communication device, such as the UE 115 or UE 600, may utilize one or more components, such as such as the processor 602, the memory 604, the sidelink beam failure recovery module 608, the transceiver 610, the modem 612, and the one or more antennas 616, to execute aspects of the method 900. As illustrated, the method 900 includes a number of enumerated aspects, but the method 900 may include additional aspects before, after, and in between the enumerated aspects. In some aspects, one or more of the enumerated aspects may be omitted or performed in a different order.

At action 910, the method 900 includes a candidate relay UE (e.g., the UE 115 or UE 600) receiving a plurality of beam failure detection reference signals (BFD RSs) from a sidelink UE. In this regard, the BFD RSs may include primary sidelink synchronization signals (PSSSs), secondary sidelink synchronization signals (SSSSs), channel state information reference signals (CSI-RSs), demodulation reference signals, or other suitable reference signals. The BFD RSs may be associated with a first plurality of beams received by the sidelink UE. The candidate relay UE may receive the plurality of BFD RSs at a millimeter wave frequency (e.g., FR2, FR3 frequencies).

The sidelink UE and the candidate relay UE may establish a beamformed link. The beamformed link may be a directional link established by one more directional antennas in each of the sidelink UE and the candidate relay UE. The beamformed link may enable higher data rates for longer distances compared to non-beamformed links using omnidirectional antennas. The beamformed link may compensate for pathloss at higher frequencies (e.g., FR2, FR3 frequencies). As beamforming enables directional transmission between the sidelink UE and the candidate relay UE, the beamformed link between the sidelink UE and the candidate relay UE may allow for spatial reuse of available resources due to reduced interference among the UEs.

In some aspects, the sidelink UE may be out of network coverage of a network unit (e.g. the BS 105, the CU 210, the DU 230, the RU 240, and/or network unit 700). When the sidelink UE is out of coverage of a network unit, the sidelink UE may use other sidelink UEs (e.g., active serving relay UEs) to relay communications to and/or from the network unit. The active serving relay UE(s) may establish a beamformed link with the sidelink UE to relay the communications to and/or from the network unit. Since the sidelink UE may be mobile, the sidelink UE may establish beamformed links with one or more active serving relay UEs and one or more candidate relay UEs. The candidate relay UE(s) may not be active serving relay UE(s). The beamformed links may be established with the candidate relay UE(s) such that when the sidelink UE is out of coverage of the active serving relay UE(s), the sidelink UE may quickly switch to using a candidate relay UE as an active serving relay UE. In this regard, the sidelink UE may use layer 1 (e.g., physical layer) and/or layer 2 (e.g., MAC layer) signaling to switch the candidate relay UE to an active serving relay UE.

At action 920, the method 900 includes the candidate relay UE detecting a beam failure associated with a first beam of the first plurality of beams based on a BFD RS measurement associated with the first beam. In this regard, the candidate relay UE may measure the reference signal received power (RSRP) of the first beam. The candidate relay UE may detect a failure of the first beam when the RSRP satisfies a threshold. For example, the candidate relay UE may detect a failure of the first beam when the RSRP of the of the first beam is equal to or below an RSRP threshold. In some aspects, the candidate relay UE may receive an indicator indicating the sidelink UE is configured for beam failure recovery (BFR). The BFR process may detect when beam failure occurs and the link is lost on a first beam but is able to maintain the link by switching to another beam (e.g., a second beam). Beam failure detection may include a combined L1/L2 procedure where the PHY layer provides the MAC layer indications of beam failure instances (BFIs). The MAC layer may count the indications and detect a failure when a configured maximum number of BFI indications has been reached. Whenever the PHY layer of the candidate relay UE detects that the RSRP of the reference signal from the sidelink UE beam goes below the threshold (e.g., 10% BLER of a hypothetical PDCCH), the candidate relay UE may trigger a beam failure instance (BFI) and send a BFI indicator to the MAC. The MAC layer may start a timer as soon as it receives a BFI indicator and increment a counter by 1 for every BFI. When a certain threshold number of BFIs is reached, the MAC may trigger the BFR procedure.

At action 930, the method 900 includes the candidate relay UE transmitting an indicator indicating the detected beam failure to at least one of the sidelink UE or a network unit. In this regard, the candidate relay UE may transmit the indicator to the sidelink UE via RRC signaling, a MAC CE communication, SCI (e.g., SCI-1, SCI-2), a PSCCH communication, a PSSCH communication, or other suitable communication. In some aspects, the candidate relay UE may transmit the indicator to the network unit further indicating that the current candidate link will not be used before the link is recovered via RRC signaling, a MAC CE communication, UCI, a PUCCH communication, a PUSCH communication, or other suitable communication.

In some aspects, the indicator may further indicate a second beam of the plurality of beams as a replacement for the first beam. Indicating the second beam as a replacement beam may be based on a measurement associated with the second beam. For example, the candidate relay UE may perform measurements (e.g., RSRP measurements) on the BFD RSs received via the plurality of beams from the sidelink UE. When the RSRP measurement of the second beam is higher (e.g., higher by more than a threshold) than the RSRP measurement of the first beam, the candidate relay UE may transmit the indicator indicating the second beam as a replacement for the first beam. When the candidate relay UE replaces the first beam with the second beam, the candidate relay UE may then monitor the BFD RSs associated with the second beam. In this regard, the candidate relay UE may reset the transmission configuration indicator (TCI) of the sidelink UE to the replacement (e.g., second) beam. For example, the candidate relay UE may set its analog beamforming coefficients based on the TCI for receiving the BFD RSs associated with the second beam.

In some aspects, the candidate relay UE may be mobile. When the candidate relay UE is mobile, the measured signal strength of the BFD RSs transmitted by the sidelink UE may vary based on the distance and/or the channel between the sidelink UE and the candidate relay UE. For example, as the distance between the sidelink UE and the candidate relay UE increases, the measured signal strength of the BFD RSs transmitted by the sidelink UE may decrease. In this case, the beam failure recovery process on the candidate relay UE may fail. The candidate relay UE may transmit the indicator to the network unit (e.g., transmit the indicator via an RU 240). In response, the candidate relay UE may receive an indicator from the network unit to deactivate the beam failure recovery process on the candidate relay UE. Additionally or alternatively, the candidate relay UE may autonomously transmit an indicator to the sidelink UE to deactivate the beam failure recovery process. The process of activating and deactivating candidate relay UEs may continue as the distance and/or the channel between the sidelink UE and candidate relay UEs varies.

In some aspects, as the distance and/or the channel between the sidelink UE and the active serving relay UE(s) varies, the network unit may replace an active serving relay UE with a candidate relay UE after actions 910 to 930 are completed. For example, the sidelink UE may report RSRP measurements associated with BFD RSs from candidate relay UE(s) and active serving relay UE(s). The network unit may determine to replace an active serving relay UE with a candidate relay UE. In this regard, the network unit may transmit an indicator to the sidelink UE to configure a candidate relay UE as an active serving relay UE.

Further aspects of the present disclosure include the following:

Aspect 1 includes a method of wireless communication performed by a sidelink user equipment (UE), the method comprising receiving, from a first candidate relay UE, a plurality of beam failure detection reference signals (BFD RSs) associated with a first plurality of beams; detecting, based on at least one BFD RS of the plurality of BFD RSs, a beam failure associated with a first beam of the first plurality of beams based on a measurement associated with the first beam; and transmitting, to at least one of the first candidate relay UE or a network unit, an indicator indicating the detected beam failure.

Aspect 2 includes the method of aspect 1, wherein the indicator further indicates a second beam of the plurality of beams as a replacement for the first beam based on a measurement associated with the second beam.

Aspect 3 includes the method of any of aspects 1-2, wherein the transmitting the indicator to at least one of the first candidate relay UE or the network unit comprises transmitting the indicator to the first candidate relay UE; and monitoring for the plurality of BFD RSs associated with the first plurality of beams based on a transmission configuration indication (TCI) associated with the second beam.

Aspect 4 includes the method of any of aspects 1-3, further comprising receiving an indicator indicating the first candidate relay UE is configured for beam failure recovery.

Aspect 5 includes the method of any of aspects 1-4, wherein the sidelink UE is out of network coverage of the network unit; and the transmitting the indicator to at least one of the first candidate relay UE or the network unit comprises transmitting the indicator to the network unit via a serving relay UE.

Aspect 6 includes the method of any of aspects 1-5, further comprising receiving, from a second candidate relay UE, a second plurality of BFD RSs associated with a second plurality of beams, wherein the transmitting the indicator to at least one of the first candidate relay UE or the network unit comprises transmitting the indicator to the network unit via a serving relay UE; and the indicator further indicates a UE identifier associated with the second candidate relay UE based on a measurement associated with the second plurality of BFD RSs.

Aspect 7 includes the method of any of aspects 1-6, wherein the second candidate relay UE is not an active serving relay UE of the sidelink UE.

Aspect 8 includes the method of any of aspects 1-7, further comprising transmitting, to the first candidate relay UE, an indicator to deactivate beam failure recovery on the first candidate relay UE.

Aspect 9 includes the method of any of aspects 1-8, further comprising receiving, from the network unit, an indicator to activate beam failure recovery on the second candidate relay UE.

Aspect 10 includes the method of any of aspects 1-9, wherein the receiving the plurality of BFD RSs comprises receiving the plurality of BFD RSs at a millimeter wave frequency.

Aspect 11 includes a method of wireless communication performed by a candidate relay user equipment (UE), the method comprising receiving, from a sidelink UE, a plurality of beam failure detection reference signals (BFD RSs) associated with a plurality of beams; detecting, based on at least one BFD RS of the plurality of BFD RSs, a beam failure associated with a first beam of the plurality of beams based on a measurement associated with the first beam; and transmitting, to at least one of the sidelink UE or a network unit, an indicator indicating the detected beam failure.

Aspect 12 includes the method of aspect 11, wherein the indicator further indicates a second beam of the plurality of beams as a replacement for the first beam based on a measurement associated with the second beam.

Aspect 13 includes the method of any of aspects 11-12, wherein the transmitting the indicator to at least one of the sidelink UE or the network unit comprises transmitting the indicator to the sidelink UE; and further comprising monitoring for the plurality of BFD RSs associated with the first plurality of beams based on a transmission configuration indication (TCI) associated with the second beam.

Aspect 14 includes the method of any of aspects 11-13, wherein the candidate relay UE is configured for beam failure recovery.

Aspect 15 includes the method of any of aspects 11-14, wherein the sidelink UE is out of network coverage of the network unit; and the transmitting the indicator to at least one of the sidelink UE or the network unit comprises transmitting the indicator to the network unit via a transmission reception point.

Aspect 16 includes a non-transitory computer-readable medium storing one or more instructions for wireless communication, the one or more instructions comprising one or more instructions that, when executed by one or more processors of a sidelink UE perform any one of aspects 1-10.

Aspect 17 includes a non-transitory computer-readable medium storing one or more instructions for wireless communication, the one or more instructions comprising one or more instructions that, when executed by one or more processors of a candidate relay user equipment (UE), cause the candidate relay UE to perform any one of aspects 11-15.

Aspect 18 includes a sidelink UE comprising one or more means to perform any one or more of aspects 1-10.

Aspect 19 includes a candidate relay user equipment (UE) comprising one or more means to perform any one or more of aspects 11-15.

Aspect 20 includes a sidelink UE comprising a memory; a transceiver; and at least one processor coupled to the memory and the transceiver, wherein the UE is configured to perform any one or more of aspects 1-10.

Aspect 21 includes a candidate relay user equipment (UE)(comprising a memory; a transceiver; and at least one processor coupled to the memory and the transceiver, wherein the candidate relay UE is configured to perform any one or more of aspects 11-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a sidelink user equipment (UE), the method comprising:
   receiving, from a first candidate relay UE, a plurality of beam failure detection reference signals (BFD RSs) associated with a first plurality of beams;
   detecting, based on at least one BFD RS of the plurality of BFD RSs, a beam failure associated with a first beam of the first plurality of beams based on a measurement associated with the first beam;
   transmitting, to the first candidate relay UE, an indicator indicating the detected beam failure, wherein the indicator further indicates a second beam of the plurality of beams as a replacement for the first beam based on a measurement associated with the second beam; and
   monitoring for the plurality of BFD RSs associated with the first plurality of beams based on a transmission configuration indication (TCI) associated with the second beam.

2. The method of claim 1, further comprising:
   receiving an indicator indicating the first candidate relay UE is configured for beam failure recovery.

3. A method of wireless communication performed by a sidelink user equipment (UE), the method comprising:
   receiving, from a first candidate relay UE, a plurality of beam failure detection reference signals (BFD RSs) associated with a first plurality of beams;

detecting, based on at least one BFD RS of the plurality of BFD RSs, a beam failure associated with a first beam of the first plurality of beams based on a measurement associated with the first beam;

transmitting, to the network unit via a serving relay UE, an indicator indicating the detected beam failure;

receiving, from a second candidate relay UE, a second plurality of BFD RSs associated with a second plurality of beams, wherein the indicator further indicates a UE identifier associated with the second candidate relay UE based on a measurement associated with the second plurality of BFD RSs.

4. The method of claim 3, wherein the second candidate relay UE is not an active serving relay UE of the sidelink UE.

5. The method of claim 3, further comprising:
transmitting, to the first candidate relay UE, an indicator to deactivate beam failure recovery on the first candidate relay UE.

6. The method of claim 3, further comprising:
receiving, from the network unit, an indicator to activate beam failure recovery on the second candidate relay UE.

7. The method of claim 1, wherein the receiving the plurality of BFD RSs comprises receiving the plurality of BFD RSs at a millimeter wave frequency.

8. A method of wireless communication performed by a candidate relay user equipment (UE), the method comprising:
receiving, from a sidelink UE, a plurality of beam failure detection reference signals (BFD RSs) associated with a plurality of beams;
detecting, based on at least one BFD RS of the plurality of BFD RSs, a beam failure associated with a first beam of the plurality of beams based on a measurement associated with the first beam;
transmitting, to at least one of the sidelink UE, an indicator indicating the detected beam failure, wherein the indicator further indicates a second beam of the plurality of beams as a replacement for the first beam based on a measurement associated with the second beam; and
monitoring for the plurality of BFD RSs associated with the first plurality of beams based on a transmission configuration indication (TCI) associated with the second beam.

9. The method of claim 8, wherein the candidate relay UE is configured for beam failure recovery.

10. A sidelink user equipment (UE) comprising:
a memory;
a transceiver; and
at least one processor coupled to the memory and the transceiver, wherein the sidelink UE is configured to:
receive, from a first candidate relay UE, a plurality of beam failure detection reference signals (BFD RSs) associated with a first plurality of beams;
detect, based on at least one BFD RS of the plurality of BFD RSs, a beam failure associated with a first beam of the first plurality of beams based on a measurement associated with the first beam; and
transmit, to the first candidate relay UE, an indicator indicating the detected beam failure, wherein the indicator further indicates a second beam of the plurality of beams as a replacement for the first beam based on a measurement associated with the second beam; and monitor for the plurality of BFD RSs associated with the first plurality of beams based on a transmission configuration indication (TCI) associated with the second beam.

11. The sidelink UE of claim 10, wherein the sidelink UE is further configure to:
receive an indicator indicating the first candidate relay UE is configured for beam failure recovery.

12. A sidelink user equipment (UE) comprising:
a memory;
a transceiver; and
at least one processor coupled to the memory and the transceiver, wherein the sidelink UE is configured to:
receive, from a first candidate relay UE, a plurality of beam failure detection reference signals (BFD RSs) associated with a first plurality of beams;
detect, based on at least one BFD RS of the plurality of BFD RSs, a beam failure associated with a first beam of the first plurality of beams based on a measurement associated with the first beam;
transmit, to the network unit via a serving relay UE, an indicator indicating the detected beam failure, wherein the sidelink UE is out of network coverage of the network unit; and
receive, from a second candidate relay UE, a second plurality of BFD RSs associated with a second plurality of beams; and
wherein the indicator further indicates a UE identifier associated with the second candidate relay UE based on a measurement associated with the second plurality of BFD RSs.

13. The sidelink UE of claim 12, wherein the second candidate relay UE is not an active serving relay UE of the sidelink UE.

14. The sidelink UE of claim 12, wherein the sidelink UE is further configured to:
transmit, to the first candidate relay UE, an indicator to deactivate beam failure recovery on the first candidate relay UE.

15. The sidelink UE of claim 12, wherein the sidelink UE is further configured to:
receive, from the network unit, an indicator to activate beam failure recovery on the second candidate relay UE.

16. The UE of claim 10, wherein the sidelink UE is further configured to receive the plurality of BFD RSs at a millimeter wave frequency.

17. A candidate relay user equipment (UE) comprising:
a memory;
a transceiver; and
at least one processor coupled to the memory and the transceiver, wherein the candidate relay UE is configured to:
receive, from a sidelink UE, a plurality of beam failure detection reference signals (BFD RSs) associated with a plurality of beams;
detect, based on at least one BFD RS of the plurality of BFD RSs, a beam failure associated with a first beam of the plurality of beams based on a measurement associated with the first beam;
transmit, to the sidelink UE, an indicator indicating the detected beam failure, wherein the indicator further indicates a second beam of the plurality of beams as a replacement for the first beam based on a measurement associated with the second beam; and monitor for the plurality of BFD RSs associated with the first plurality of beams based on a transmission configuration indication (TCI) associated with the second beam.

18. The candidate relay UE of claim 17, wherein the candidate relay UE is configured for beam failure recovery.

* * * * *